US012713108B2

(12) United States Patent
Karia et al.

(10) Patent No.: US 12,713,108 B2

(45) Date of Patent: Aug. 18, 2026

(54) DYNAMIC ADVERTISEMENT PLACEMENT BASED ON CONTENT UNDERSTANDING AND USER DATA

(71) Applicant: Roku, Inc., San Jose, CA (US)

(72) Inventors: Snehal Karia, Fremont, CA (US); Sunil Ramesh, Saratoga, CA (US); Alexander P. Hill, Danville, CA (US); Andrew Adams, Bryn Mawr, PA (US)

(73) Assignee: Roku, Inc., San Jose, CA (US)

( * ) Notice: Subject to any disclaimer, the term of this patent is extended or adjusted under 35 U.S.C. 154(b) by 58 days.

(21) Appl. No.: 18/663,999

(22) Filed: May 14, 2024

(65) Prior Publication Data

US 2025/0358488 A1 Nov. 20, 2025

(51) Int. Cl.

| | |
|---|---|
| ***H04N 21/81*** | (2011.01) |
| ***H04N 21/2187*** | (2011.01) |
| ***H04N 21/233*** | (2011.01) |
| ***H04N 21/234*** | (2011.01) |
| ***H04N 21/442*** | (2011.01) |

(52) U.S. Cl.

CPC ....... *H04N 21/812* (2013.01); *H04N 21/2187* (2013.01); *H04N 21/233* (2013.01); *H04N 21/23412* (2013.01); *H04N 21/44213* (2013.01)

(58) Field of Classification Search

CPC ............. H04N 21/812; H04N 21/2187; H04N 21/233; H04N 21/23412; H04N 21/44213; H04N 21/2668; H04N 21/8456; H04N 21/23424; H04N 21/25891; H04N 21/44226; H04N 21/23418

USPC ........................................................... 725/14

See application file for complete search history.

(56) References Cited

U.S. PATENT DOCUMENTS 8,875,175 B1 * 10/2014 McCoy ............. H04N 21/6543 725/115
2009/0328113 A1 * 12/2009 van de Klashorst ........................ G06Q 30/0269 725/87
2012/0047542 A1 * 2/2012 Lewis ............. H04N 21/44016 725/97
2014/0143800 A1 * 5/2014 Arankalle .......... G06Q 30/0275 725/32
2014/0195358 A1 * 7/2014 Beining ............ G06Q 30/0277 705/14.73
2015/0089520 A1 * 3/2015 Lee .................. H04N 21/44204 725/14
2016/0275544 A1 * 9/2016 Jo ...................... G06Q 30/0242
2016/0292742 A1 * 10/2016 Kang ................. G06Q 30/0267
2019/0114662 A1 * 4/2019 Bennion ............ G06Q 30/0255
2019/0141394 A1 * 5/2019 Loheide ............ H04N 21/2668
2019/0222776 A1 * 7/2019 Carter .................... H04N 5/272
2021/0042077 A1 * 2/2021 Klein ................. G06Q 30/0244
(Continued)

*Primary Examiner* — Cynthia M Fogg

(74) *Attorney, Agent, or Firm* — Straylight LLP

(57) ABSTRACT

Aspects of the disclosed technology provide solutions for dynamically placing an advertisement within media content based on content understanding and/or user data. An example method can include receiving live media content, which captures a live event, analyzing the live media content to identify one or more attributes associated with the live event, and accessing user data associated with a user device displaying the live media content. The example method can further include determining a time at which an advertisement is to be inserted within the live media content based on at least one of the one or more attributes or the user data.

20 Claims, 10 Drawing Sheets

(56) References Cited

U.S. PATENT DOCUMENTS

| | | | | |
|---|---|---|---|---|
| 2021/0329352 | A1* | 10/2021 | Thomas | H04N 21/23424 |
| 2022/0038776 | A1* | 2/2022 | Ghavami | H04N 21/26603 |
| 2024/0196066 | A1* | 6/2024 | Xue | H04N 21/44016 |

* cited by examiner

DYNAMIC ADVERTISEMENT PLACEMENT BASED ON CONTENT UNDERSTANDING AND USER DATA

BACKGROUND

Field

This disclosure is generally directed to multimedia systems, and more particularly to dynamically placing an advertisement within media content based on content understanding and/or user data.

SUMMARY

Provided herein are system, apparatus, article of manufacture, method and/or computer program product embodiments, and/or combinations and sub-combinations thereof, for dynamically placing an advertisement within media content based on content understanding and/or user profile.

In some aspects, a method is provided for dynamically placing an advertisement within media content based on content understanding and/or user data. The method may be implemented by content server(s) used to provide video content/media content to remote devices and/or by a media device(s) communicatively coupled to, for example, a display device. The method can operate in other devices such as, for example and without limitation, a smart television, computer, or a mobile device, among others.

The method can operate by receiving live media content, which captures a live event. The method can include analyzing the live media content to identify one or more attributes associated with the live event. The method also can include accessing user data associated with a user device displaying the live media content. Based on at least one of the one or more attributes or the user data, a time at which an advertisement is to be inserted within the live media content can be determined.

In some aspects, a system is provided for dynamically placing an advertisement within media content based on content understanding and/or user data. The system can include one or more memories and at least one processor coupled to at least one of the one or more memories and configured to receive live media content, which captures a live event. The at least one processor of the system can be configured to analyze the live media content to identify one or more attributes associated with the live event. The at least one processor of the system can also be configured to access user data associated with a user device displaying the live media content. Based on at least one of the one or more attributes or the user data, the at least one processor of the system can be configured to determine a time at which an advertisement is to be inserted within the live media content.

In some aspects, a non-transitory computer-readable medium is provided for dynamically placing an advertisement within media content based on content understanding and/or user data. The non-transitory computer-readable medium can have instructions stored thereon that, when executed by at least one computing device, cause the at least one computing device to receive live media content, which captures a live event. The instructions of the non-transitory computer-readable medium can, when executed by the at least one computing device, cause the at least one computing device to analyze the live media content to identify one or more attributes associated with the live event. The instructions of the non-transitory computer-readable medium can, when executed by the at least one computing device, also cause the at least one computing device to access user data associated with a user device displaying the live media content. Based on at least one of the one or more attributes or the user data, the instructions of the non-transitory computer-readable medium can, when executed by the at least one computing device, cause the at least one computing device to determine a time at which an advertisement is to be inserted within the live media content.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
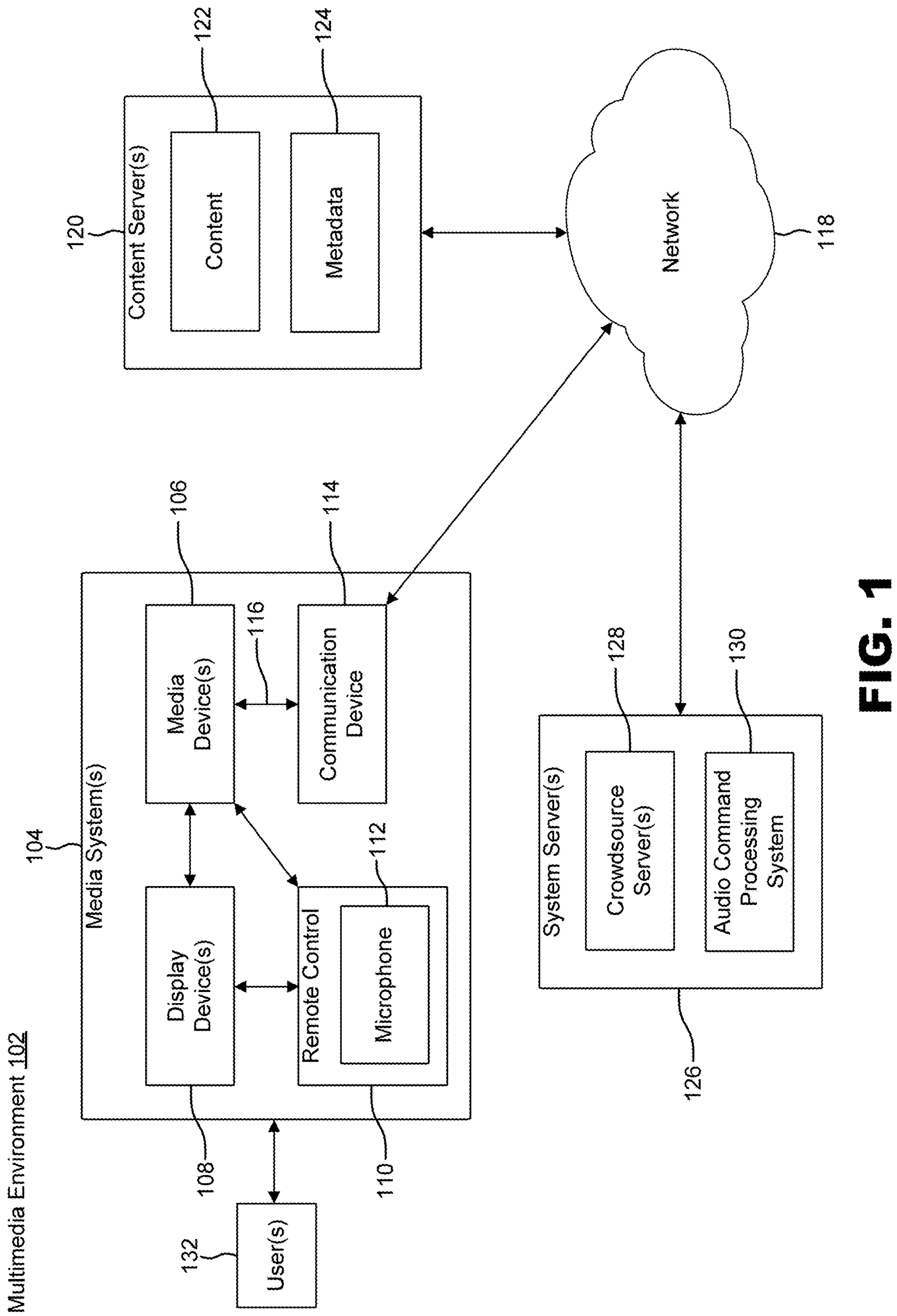
FIG. 1 illustrates a block diagram of an example multimedia environment, according to some examples of the present disclosure.

Users access and consume media content such as videos, at any time of day or any location, using a wide variety of client devices such as, for example, and without limitation, smart phones, desktop computers, laptop computers, tablet computers, televisions (TVs), among others. The media content can include advertisements that depict, describe, announce, promote, identify, and/or relate to a product(s), a service(s), a brand(s), an event(s), a message(s), and/or any other item. Such media content may be accessible on various platforms across diverse channels by a wide range of viewers.

Live media content refers to a type of media (such as video, audio, or text) that is broadcast or streamed in real-time, or near real-time, to an audience, such as television broadcasts, live streamlining on platforms, live radio broadcasts, live webinars, live social media broadcasts, and so on, which involve sports events, music performances, press conferences, etc. As live content often fosters a sense of immediacy, interactivity, and engagement with the audience, an advertisement abruptly inserted within the live content can be perceived as intrusive or disruptive and result in losing continuity and creating an overall poor user experience. Also, a lack of user context in advertisements leads to users who are unlikely to be interested or receptive, and therefore, irrelevant content is more likely to be ignored or viewed negatively by users.

Aspects of the disclosed technology provide solutions for dynamically placing an advertisement within live media content based on media content understanding and/or user data (e.g., information derived from live media content and/or user profile). In some aspects, a system (e.g., one or more content servers) can analyze live media content and/or user profile to determine an advertisement break within the live media content. For example, based on the analysis of the media content and/or user profile, a point in time and duration for serving an advertisement, can be determined based on an understanding of the live media content and/or user profile. As such, an advertisement can be delivered, during live streaming, to the right audience at the right time and for the right duration, thereby linking the user experience (e.g., advertisement experience) to the audience/user in a personalized way.

A system such as a content server(s) can, for an advertisement to be inserted within the live media content, determine temporal, spatial, and/or contextual attributes of the advertisement based on the analysis of the live media content and/or user profile. For example, the system can determine the timing or scheduling of when an advertisement is displayed or broadcasted during the live media content. Also, the system can determine the physical or geographic placement or size of the advertisement in which it is presented on a display of user devices. The system can also determine the context of an advertisement such as a type or genre of an advertisement, a relevance to a viewer/audience, and so on.

In some implementations, machine learning techniques can be used to analyze live media content and/or user profile and determine an advertisement break, in which an advertisement is to be inserted within the live media content. For example, machine learning techniques can be used to generate event caption(s), based on signals in the live media content (e.g., visual signal, audio signal, text or closed caption signal, etc.), representing information about the live media content. The machine learning techniques can, using these event captions, determine various dimensions (e.g., temporal, spatial, and contextual dimensions) of an advertisement to be inserted within the live media content.

As discussed in further detail below, the technologies and techniques described herein can significantly improve user experience by providing solutions for dynamically placing an advertisement within media content based on content understanding and/or user data. Furthermore, instead of periodic or predetermined advertisement breaks without user context, the continuity of the live events, immediacy, and engagement of the user can be preserved, despite an advertisement break within the live media content, by providing solutions for dynamically inserting a personalized advertisement, within the live media content, that is tailored to users' preferences and improving the user experience.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, audio, videos, movies, TV programs, multimedia, images, still pictures, text, graphics, gaming applications, advertisements, programming content, public service content, government content, local community content, software, recording or live feed from a surveillance and security system, and/or any other content or data objects in electronic form.

In some examples, content 122 may include live media content, which is broadcast or streamed in real-time such as television broadcasts, live streamlining on platforms, live radio broadcasts, live webinars, live social media broadcasts, and so on. The live media content can involve a wide range of genres and interests such as sports events (e.g., football, soccer, basketball, baseball, tennis, golf, etc.), live news broadcasts, live gaming/gameplay streams, music performances (e.g., concerts, performances, or studio sessions), press conferences, live streaming of stock exchange market or trading activities, live fitness classes, live cooking shows and food streams, live travel and nature streams, etc.

In some configurations, a portion of content 122 (e.g., live media content) may include an advertisement that promotes or is otherwise associated with a product, service, business, brand, and/or event. For example, content 122 may include an advertisement, which is inserted within the live media content and to be displayed on a device (e.g., display device 108, media device 106, user device, client device, etc.).

The metadata 124 comprises data about content 122 (e.g., live media content capturing a live event). For example, metadata 124 may include associated or ancillary information indicating or related to a title or name of a live event broadcasted in content 122, a type, theme, or genre of the live event, a geographic location or region of the live event, a venue (e.g., stadium, studio, amphitheater, etc.) of the live event, purpose or format of the live event, participants in the live event (e.g., hosts, presenters, players, performers, guests, collaborators, etc.), statistics relating to the live event, progress of the live event, rules associated with the live event, technical specifications (e.g., video resolution, audio quality, streaming bitrate, encoding format, playback settings, etc.), accessibility features, data related to audience engagement and viewer metrics, sponsors of the live event, and/or any other information pertaining or relating to the content 122.

In some cases, metadata 124 comprises information relating to a source identifier of an advertisement that is associated with or is to be placed within content 122 (e.g., live media content). For example, a source identifier can include a business, a service provider, supplier, manufacturer, an entity, or an individual that is associated with content 122 that promotes, depicts, describes, announces, identifies, and/or is related to a product(s), a service(s), a brand(s), an event(s), a message(s), and/or any other item.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
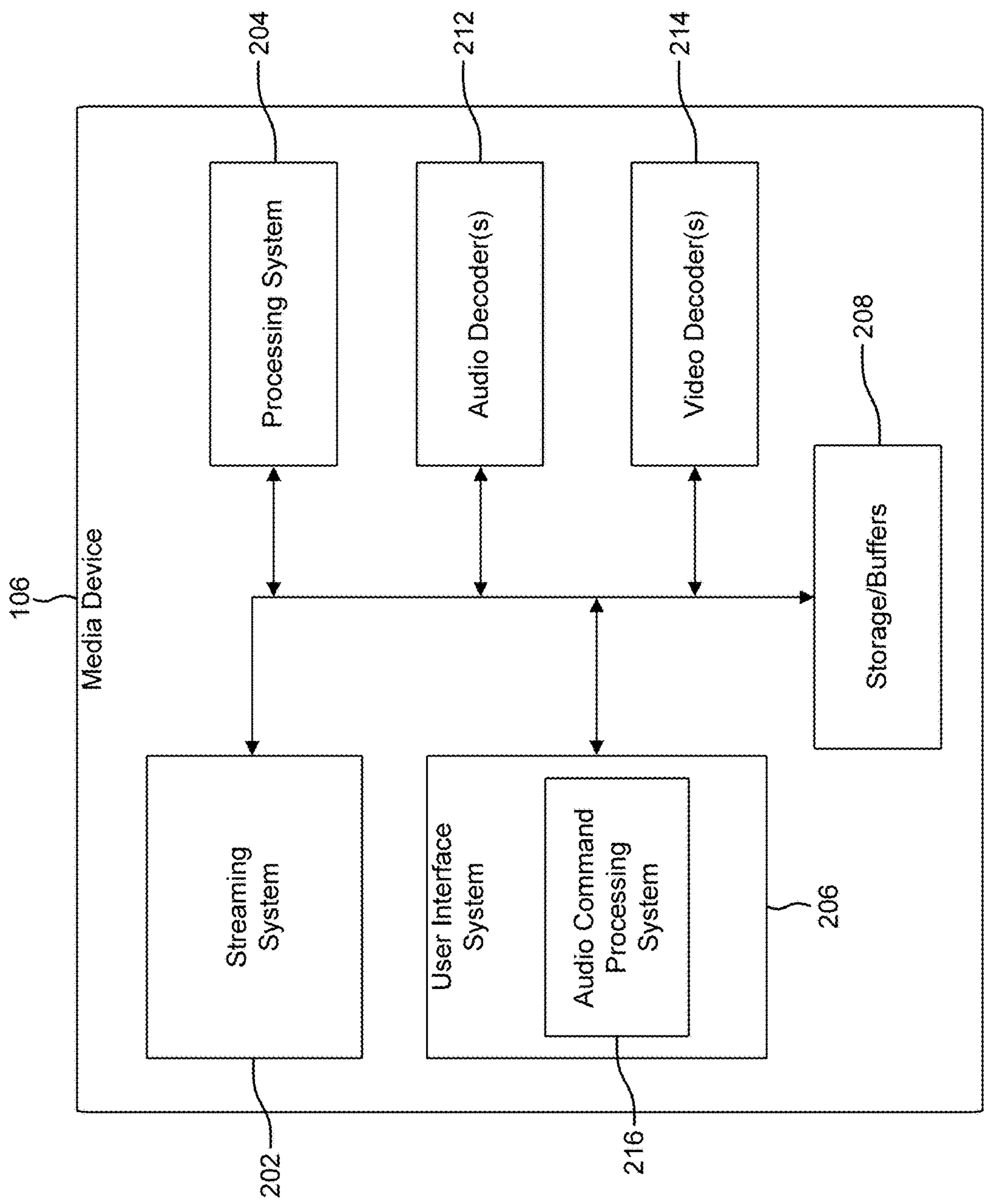
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Customization of Advertisement Insertion into Live Media Streams

Referring to FIG. 1, content server(s) 120 and/or media system 104 can be configured to perform applicable functions related to analyzing live media content (e.g., content 122) to identify one or more attributes associated with the live event that is being captured in live media content. For example, content server(s) 120 and/or media system 104 can be configured to determine contextual information associated with the live event, based on the understanding and analysis of content 122 and/or metadata 124. Such contextual information derived from live media content 122 and/or metadata 124 can include a type, theme, or genre of the live event associated with the live media content (e.g., content 122), a geographic location or venue of the live event, a format or rules of the live event, participants in the live event (e.g., hosts, presenters, players, performers, guests, collaborators, etc.) and their profiles (e.g., demographics, statistics, sponsorships, etc.), a banner, sign, advertising board (e.g., perimeter advertising boards), or any advertising-related objects displayed in the live event, on-going or real-time progress of the live event, a current mood and/or sentiment, a time and/or date, weather, and/or any other characteristics associated with the live event captured in content 122.

In some aspects, content server(s) 120 and/or media system 104 can access user profile or user profile information to identify information associated with a viewer who is currently served with content 122 (e.g., live media content) on a viewer's device (e.g., (e.g., display device 108, media device 106, user device, client device, etc.). The user profile or user profile information can include, for example and without limitation, user demographics (e.g., age, sex, geographic location, income, generation, occupation, etc.), user preferences (e.g., following teams or players, etc.), geographic location, privacy settings, viewing history or viewing patterns, social media activities, and so on.

In some examples, content server(s) 120 and/or media system 104 can determine an advertisement break within content 122 (e.g., a time at which an advertisement is to be inserted within live media content) based on the analysis of content 122 and/or user profile. For example, content server(s) 120 and/or media system 104 can analyze content 122 (e.g., live media content) to identify one or more attributes or characteristics associated with the live event that is captured in content 122 to predict and determine a moment within content 122 that an advertisement can be inserted without spoiling the continuity of the live event. Also, content server(s) 120 and/or media system 104 can access and analyze user data (e.g., user profile information) to count user context in determining the advertisement break within content 122. As follows, an advertisement break within live media content (e.g., live streams) can be placed at the right moment in time during an ongoing live event and tailored to a particular user to create an engaging and immersive user experience.

In some examples, content server(s) 120 or the media device(s) 106 can use an algorithm, such as a machine learning algorithm, to determine an advertisement break that is to be placed within content 122 (e.g., live media content). For example, an input to a machine learning algorithm can include content 122, metadata 124, and/or user data (e.g., user profile information). The machine learning algorithm then can determine various dimensions (e.g., temporal, spatial, and contextual dimensions) of an advertisement and generate an output, which includes an advertisement insertion within content 122.

Figure 3:
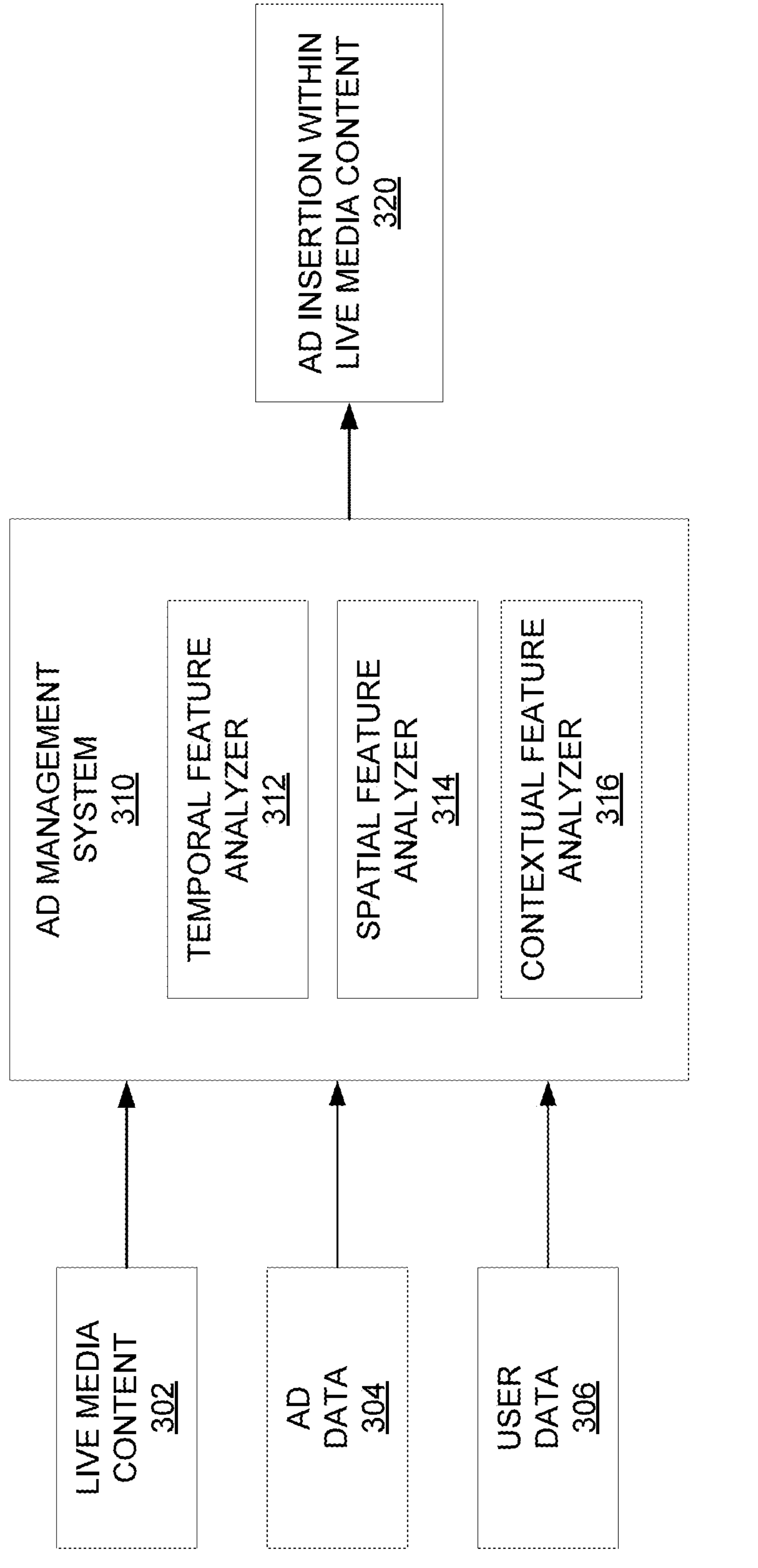
FIG. 3 illustrates an example system for dynamic advertisement placement within live media content, according to some examples of the present disclosure.

The disclosure now continues with a further discussion of dynamically generating media content. Specifically, FIG. 3 is an example system 300 for dynamic advertisement placement within live media content. The system 300 includes live media content 302, advertisement (AD) data 304, user data 306, and AD management system 310. The AD management system 310 functions to determine and analyze live media content 302, AD data 304, and user data 306 and generate an output, which includes ad insertion within live media content 320 using temporal feature analyzer 312, spatial feature analyzer 314, and contextual feature analyzer 316.

The various components of system 300 can be implemented at applicable places in the multimedia environment 102 shown in FIG. 1. Specifically, media content 302 can reside at the content server(s) 120. Further, media content 302 can reside at media system 104 as part of reproducing media content 302 or placing media content 302 within a customized background for user 132. Furthermore, AD management system 310 can reside at media system 104, system servers 126, content server(s) 120, or a combination thereof.

The AD management system 310 functions to receive live media content 302, which may correspond to content 122 illustrated in FIG. 1. As previously mentioned, live media content 302 can be broadcast or streamed in real-time to an audience/viewer in the form of television broadcasts, live streaming on various platforms (e.g., YouTube, Twitch, etc.), radio broadcasts, webinars, social media broadcasts, and so on. The live media content 302 can involve various genres, for example without limitation, sports events (e.g., football, soccer, basketball, baseball, tennis, golf, etc.), live news broadcasts, live gaming/gameplay streams, music performances (e.g., concerts, performances, or studio sessions), press conferences, live fitness classes, live cooking shows and food streams, live travel and nature streams, standup comedy/talk shows, etc.

In some examples, live media content 302 may include content metadata (e.g., metadata 124 as illustrated in FIG. 1) or information about the live media content 302 such as a type, theme, or genre of the live event associated with live media content 302, a geographic location or venue of the live event, a format or rules of the live event, participants in the live event (e.g., hosts, presenters, players, performers, guests, collaborators, etc.) and their profiles (e.g., demographics, statistics, sponsorships, etc.), a banner, sign, advertising board (e.g., perimeter advertising boards), or any advertising-related objects displayed in the live event, ongoing or real-time progress of the live event, a current mood and/or sentiment, a time and/or date, weather, and/or any other characteristics associated with the live event captured in live media content 302.

In some aspects, AD management system 310 functions to receive AD data 304, which includes one or more advertisements that are to be inserted/placed during playback of live media content 302 and information associated with the advertisement(s). For example, advertisement(s) can be in the form of one or more video frames (e.g., a plurality of video frames or a sequence of video frames) depicting, describing, announcing, promoting, identifying, and/or related to a product(s), a brand(s), an event(s), a message(s), an object(s), a service(s), and/or any other item.

Further, the AD data 304 may include information associated with the product(s), a brand(s), an event(s), a message(s), an object(s), a service(s), and/or any other item that is depicted in the advertisement(s). For example, AD data 304 can include advertisement history, marketplaces, target consumers/customers, a sponsoring team, player, or athlete, a brand ambassador or celebrity endorser, and so on. In some illustrations, AD data 304 can further include information associated with a source identifier or advertiser data such as a business name, a brand name, a type of business or industry, a logo, a business location, a style or image that the advertisement is promoting, etc.

The AD management system 310 also functions to receive user data 306 (e.g., user profile information). For example, AD management system 310 can receive user data 306, which may include any information associated with user(s) 132 or viewer who may be or is currently viewing live media content 302. Non-limiting examples of user profile information can include user demographics (e.g., age, sex, geographic location, income, generation, occupation, etc.), user preferences (e.g., following teams or players, etc.), a geographic region or location of the viewer or a location for streaming live media content 302, privacy settings, viewing history or viewing patterns, search history, social media data representing social media activities, and so on.

The AD management system 310 may analyze or evaluate live media content 302, AD data 304, and/or user data 306 to determine temporal, spatial, and contextual aspects of an advertisement to be inserted/placed within live media content 302. That is, AD management system 310 such as temporal feature analyzer 312, spatial feature analyzer 314, and contextual feature analyzer 316 can compute, based on the analysis and understanding of live media content 302, AD data 304, and/or user data 306, advertisement insertion characteristics (e.g., spatial, temporal, contextual aspects) and generate AD insertion within live media content 320, which is then served for a viewer/user.

In some cases, AD management system 310 can use control voltage (CV) representing a DC electrical signal and controls pitch, visual/image signals, audio signals, and text signals (e.g., closed caption) of live media content 302 to identify an opportunity for an advertisement to be inserted during live streaming. For example, AD management system 310 may evaluate CV and/or audio signals to determine if commentators are providing, during a timeout, gameplay analysis that a viewer may not want to miss or be interrupted by an advertisement.

The temporal feature analyzer 312 is configured to determine the timing or scheduling of when an advertisement is displayed within live media content 302. For example, temporal features analyzer 312 can evaluate live media content 302, AD data 304, and/or user data 306 and compute temporal attributes of the advertisement that is to be inserted within live media content 302, for example, including the timing, frequency, duration or length, and any other temporal aspects associated with the advertisement insertion.

The spatial feature analyzer 314 is configured to determine the physical placement and/or size of the advertisement (e.g., aspect ratio and/or screen region) in which it is presented on a display of user devices. For example, spatial feature analyzer 314 can evaluate live media content 302, AD data 304, and/or user data 306 and compute spatial attributes of the advertisement to be inserted within live media content 302, for example, including placement or position within a display of a user device or viewer's device, a size or aspect ratio of the display of the advertisement, scaling of visualization, screen ratio between a display of the advertisement and a display of live media content 302, and any other spatial aspects associated with the advertisement insertion.

In some aspects, live media content 302 can be shown on a companion device (e.g., mobile device, computer, wearable device, etc.). The spatial feature analyzer 314 can evaluate live media content 302, AD data 304, and/or user data 306 and compute spatial attributes of the advertisement to be inserted within live media content 302, when presented on the companion device. For example, spatial feature analyzer 314 can compute spatial attributes to adjust the size, resolution, or aspect ratio to fit the display of the companion device.

The contextual feature analyzer 316 is configured to determine the context or contextual aspect of an advertisement that is to be displayed within live media content 302. For example, contextual feature analyzer 316 can evaluate live media content 302, AD data 304, and/or user data 306 and compute contextual attributes of the advertisement, for example, including a type or genre of an advertisement, a relevance to a viewer/audience, content alignment, cultural sensitivity, a background or surrounding environment of the advertisement, and so on.

In some implementations, live media content 302 can be a replay of a live event. That is, live media content 302 can include a replay of a live recording of an event (e.g., sports events, live news broadcasts, live gaming/gameplay streams, music performances, press conferences, live streaming of stock exchange market or trading activities, live fitness classes, live cooking shows and food streams, live travel and nature streams, etc. In such cases, AD management system 310 can remove ads that may have been inserted (e.g., ads that are stitched using Server-Side Ad Insertion (SSAI) and/or Dynamic Ad Insertion (DAI) technologies) during the happening of the live event and reinsert ads, using temporal feature analyzer 312, spatial feature analyzer 314, and/or contextual feature analyzer 316, based on temporal, spatial, and contextual attributes that are computed.

In some aspects, temporal feature analyzer 312, spatial feature analyzer 314, and/or contextual feature analyzer 316 can be implemented as part of a server (e.g., content server(s) 120 and/or system server(s) 126), as part of a media device (e.g., media device(s) 106), and/or as part of cloud computing resources that may be associated with a network such as network 118.

The AD management system 310 can include an ML model (not shown) for collectively computing various dimensions of an advertisement insertion (e.g., temporal, spatial, and contextual aspects) to generate AD insertion within live media content 302 as an output. That is, AD management system 310 can include an applicable machine learning-based technique or neural network for determining an advertisement break to be placed within live media content 302 (e.g., during live streaming of live media content 302) based on live media content 302, AD data 304, and user data 306. As such, AD management system 310 can, using a machine learning-based technique as described herein, generate a customized/personalized advertisement break that is tailored to a particular live media content 302 and/or user (or a viewer).

The temporal, spatial, and/or contextual characteristics can be computed by a single model, or each characteristic may be separately computed. The model(s) can be trained on labeled data that includes legacy live media content, AD insertion characteristics (e.g., timing, duration, size, placement, user information, etc.), and measured engagement. Non-limiting examples of the ML model (e.g., neural network) can include a convolutional neural network (CNN), hidden Markov models, Recurrent Neural Network (RNN), deep learning, and Generative Adversarial Network (GAN), among others.

In some cases, AD insertion within live media content 320 can be provided to a user device for playback (e.g., display device 108, media device 106, user device, client device, etc.). For example, AD insertion within live media content 320 (e.g., an advertisement that is inserted within live media content) can be displayed, played, or presented, on a user device at the time and position, within live media content 320, that are determined by AD management system 310 based on the understanding of the content and viewer. The AD insertion 320 that is customized based on media content 302 and/or user data 306 (e.g., user profile information) can improve the user experience by adding an engaging and personalized advertisement break to live media content 302.

In some examples, AD management system 310 can be part of or implemented by content server(s) 120 illustrated in FIG. 1. For example, AD management system 310 can be a software algorithm running on content server(s) 120. In other words, AD management system 310 can be separate from content server(s) 120. For example, AD management system 310 can be or can be implemented by a different server(s), a datacenter, a software container hosted on a different system (e.g., a server(s), a cloud system, an on-premises system, etc.), a virtual machine hosted on a different system (e.g., a server(s), a cloud system, an on-premises system, etc.), a software service hosted on a distributed system, or any other system.

Figure 4:
FIG. 4 illustrates a flowchart of an example method for determining a temporal aspect of an advertisement break for dynamic advertisement placement within media content, according to some examples of the present disclosure.
Figure 4:
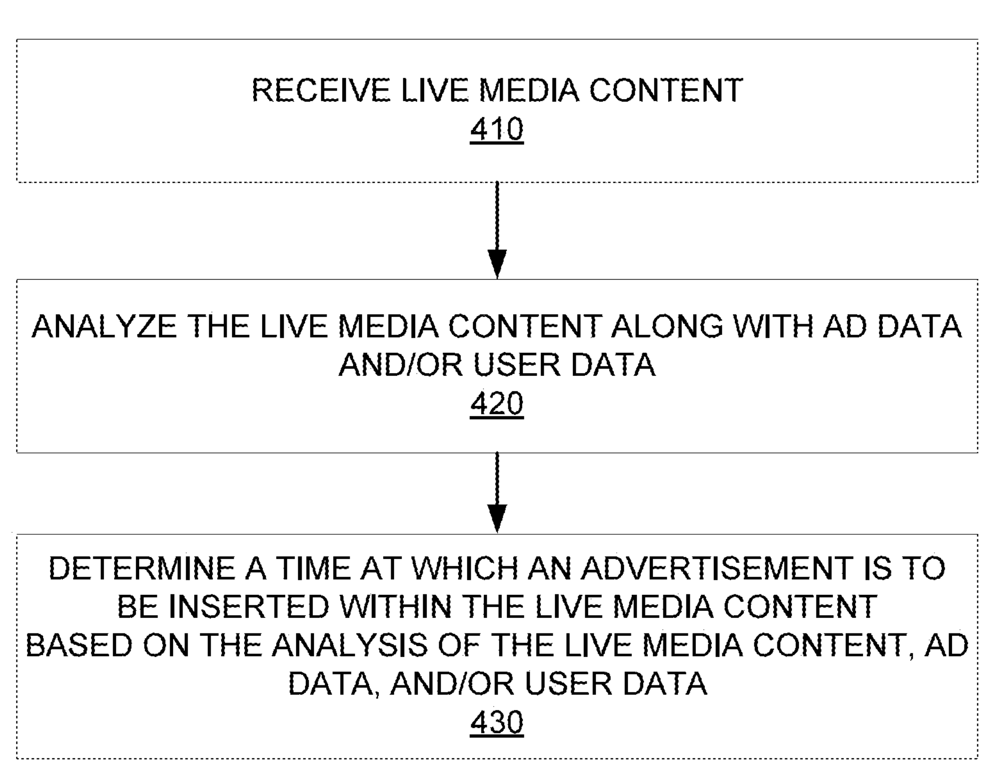

FIG. 4 illustrates a flowchart of an example method 400 for determining a temporal aspect of an advertisement for dynamic advertisement placement within media content, according to some examples of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3. However, method 400 is not limited to that example.

In step 410, method 400 includes receiving live media content, which captures a live event. For example, AD management system 310 may receive live media content 302 (e.g., live broadcasting or livestreaming). In some aspects, AD management system 310 can receive live media content 302 from a content server (e.g., content server(s) 120 over network 118) or live content sources or platforms.

In step 420, method 400 includes analyzing the live media content along with AD data and/or user data. For example, AD management system 310 may analyze/evaluate live media content 302, AD data 304 and/or user data 306, as described with respect to FIG. 3.

In step 430, method 400 includes determining a time at which an advertisement is to be inserted within the live media content based on the analysis of the live media content, AD data, and/or user data. For example, AD management system 310 may determine the timing or scheduling of when an advertisement is displayed or broadcasted during live media content 302 based on information derived from live media content 302, AD data 304, and/or user data 306.

By way of example, AD management system 310 can, based on information derived from live media content 302, AD data 304, and/or user data 306, predict what could be coming up or happening in the live event captured in live media content 302 and therefore, determine if there are certain points in time for an advertisement to be inserted, in addition to predetermined or pre-allocated advertisement breaks, during the live streaming. For example, AD management system 310 can monitor and analyze live media content 302 to identify attributes that are likely to trigger a pause in action/activity in the live event such as a whistling sound that may trigger stoppage time, a player getting injured, a golfer walking towards the next hole, tuning an instrument, etc. so that an advertisement can be placed therein without interrupting the continuity of the live event.

The method 400 can include computing further temporal aspects of an advertisement insertion based on the analysis of live media content 302, AD data 304, and/or user data 306. For example, AD management system 310 can determine a frequency of advertisement(s) during live streaming, a duration or length of an advertisement, an advertisement playback speed, and any other temporal aspects associated with the advertisement insertion based on information derived from live media content 302, AD data 304, and/or user data 306.

For example, AD management system 310 can predict how much time would be available for an advertisement break based on the countdown timer from the live event, a game clock or timer in the live event, and so on. In another example, AD management system 310 can monitor the audiences that are physically present in the live event and predict the real-time mood or sentiment (e.g., an interest level of the audience) to determine the timing and/or duration of an advertisement break. As follows, if the audience is disinterested in or not paying attention to the live event, AD management system 310 can determine that there is no critical moment or happening in the live event and transition into an advertisement break.

Figure 5:
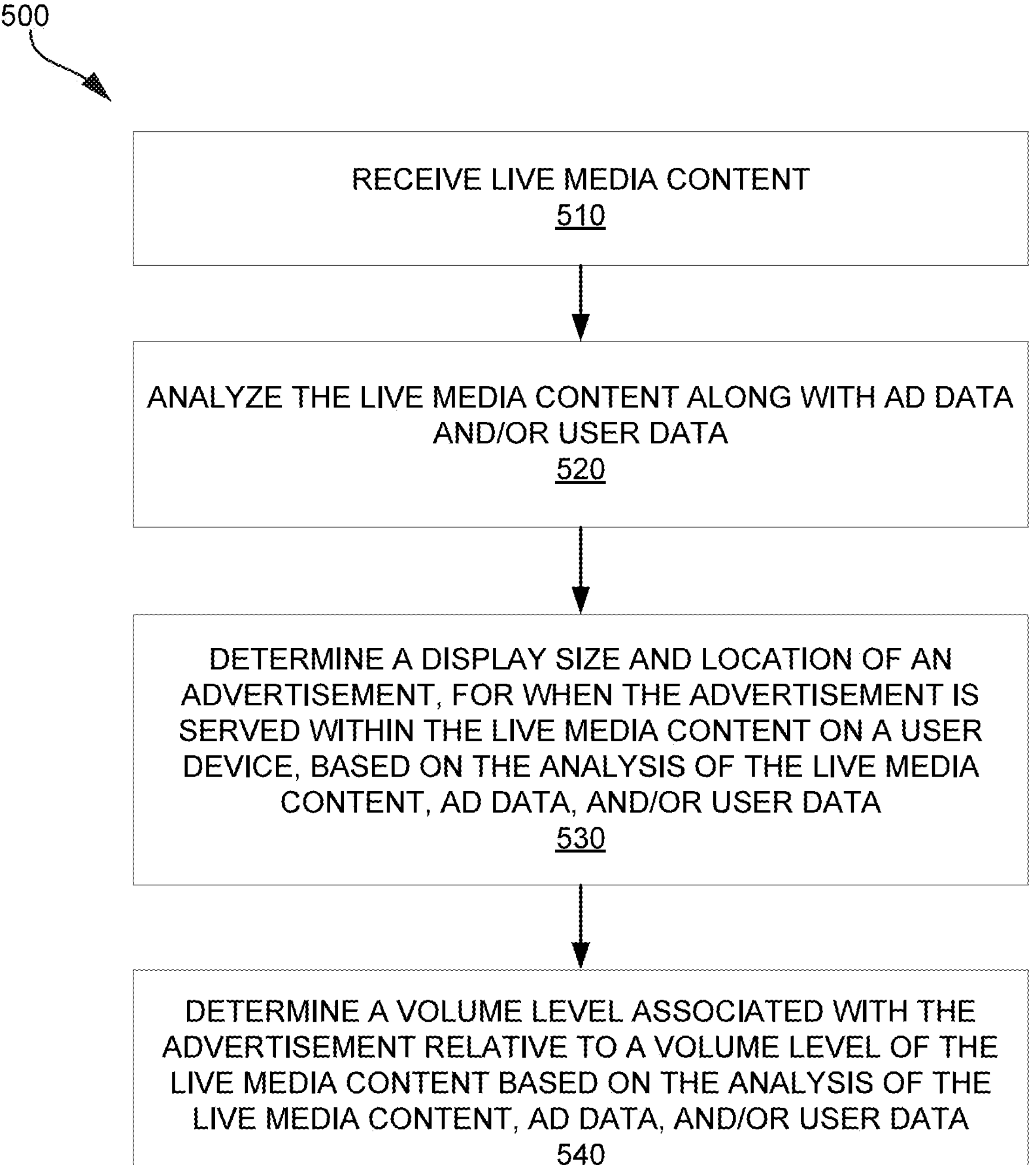
FIG. 5 illustrates a flowchart of an example method for determining a spatial aspect of an advertisement break for dynamic advertisement placement within media content, according to some examples of the present disclosure.

FIG. 5 illustrates a flowchart of an example method for determining a spatial aspect of an advertisement for dynamic advertisement placement within media content, according to some examples of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example.

In step 510, method 500 includes receiving live media content, which captures a live event. For example, AD management system 310 may receive live media content 302 (e.g., live broadcasting or livestreaming). In some aspects, AD management system 310 can receive live media content 302 from a content server (e.g., content server(s) 120 over network 118) or live content sources or platforms.

In step 520, method 500 includes analyzing the live media content along with AD data and/or user data. For example, AD management system 310 may analyze/evaluate live media content 302, AD data 304 and/or user data 306, as described with respect to FIG. 3.

In step 530, method 500 includes determining a display size and location of an advertisement, for when the advertisement is served within the live media content on a user device, based on the analysis of the live media content, AD data, and/or user data. For example, AD management system 310 may compute spatial characteristics of an advertisement insertion within live media content based on information derived from live media content 302, AD data 304, and/or user data 306. Such spatial characteristics can include, for example and without limitation, placement or position within a display of a user device or viewer's device, a size or aspect ratio of the display of the advertisement, scaling of visualization, screen ratio between a display of the advertisement and a display of live media content 302, and any other spatial aspects associated with the advertisement insertion.

To illustrate, AD management system 310 can monitor and evaluate the type of activity going on in the live event captured in live media content 302 and predict a position or location within the display of user's device for an advertisement can be placed. For example, if a top left corner of the display of the live event shows empty seats with no activity in the stadium, AD management system 310 can overlay with an advertisement a portion of the stadium on the display that would not be obtrusive to the live event.

In some configurations, AD management system 310 can use a squeeze-back advertisement insertion where the size of the live event display is reduced to allow an advertisement to be seen in the main display or around the live event display. In some cases, AD management system 310 can use a split-screen advertisement insertion where a display on a user's device is split horizontally or vertically into two regions to display an advertisement and live media content simultaneously.

In some examples, the display size of the advertisement relative to the display size of live media content 302 can be determined based on a confidence level. For example, AD management system 310 can compute a confidence level regarding whether there will be a break or time for an advertisement to be inserted and adjust the size of displaying the advertisement based on the confidence level. For example, if AD management system 310 determines that a confidence level that there will be no critical moment or happening in the live event is above a predetermined threshold, a display size of the advertisement can be larger than a display size of live media content 302 on a user's device. If AD management system 310 determines that the confidence level for no activity in the live event is below a predetermined threshold, AD management system 310 may adjust the display size such that a display size of an advertisement is smaller than a display size of live media content 302 to allow a user/viewer to have a glimpse at the live event.

In step 540, method 500 includes determining a volume level associated with the advertisement relative to a volume level of the live media content based on the analysis of the live media content, AD data, and/or user data. For example, AD management system 310 may predict, when an advertisement and a live event are displayed simultaneously on a user's device, an interest level of a viewer in live media content 302 or an advertisement and determine a volume level associated with the advertisement. For example, a device that display live media content 302 (e.g., display device 108, media device 106, etc.) can use audio, visual, and/or user-directed signaling to monitor if a user/viewer is looking at the advertisement or live media content 302. As follows, AD management system 310 can adjust the volume of the advertisement and live media content 302 based on the monitoring of the user/viewer's reaction.

Figure 6:
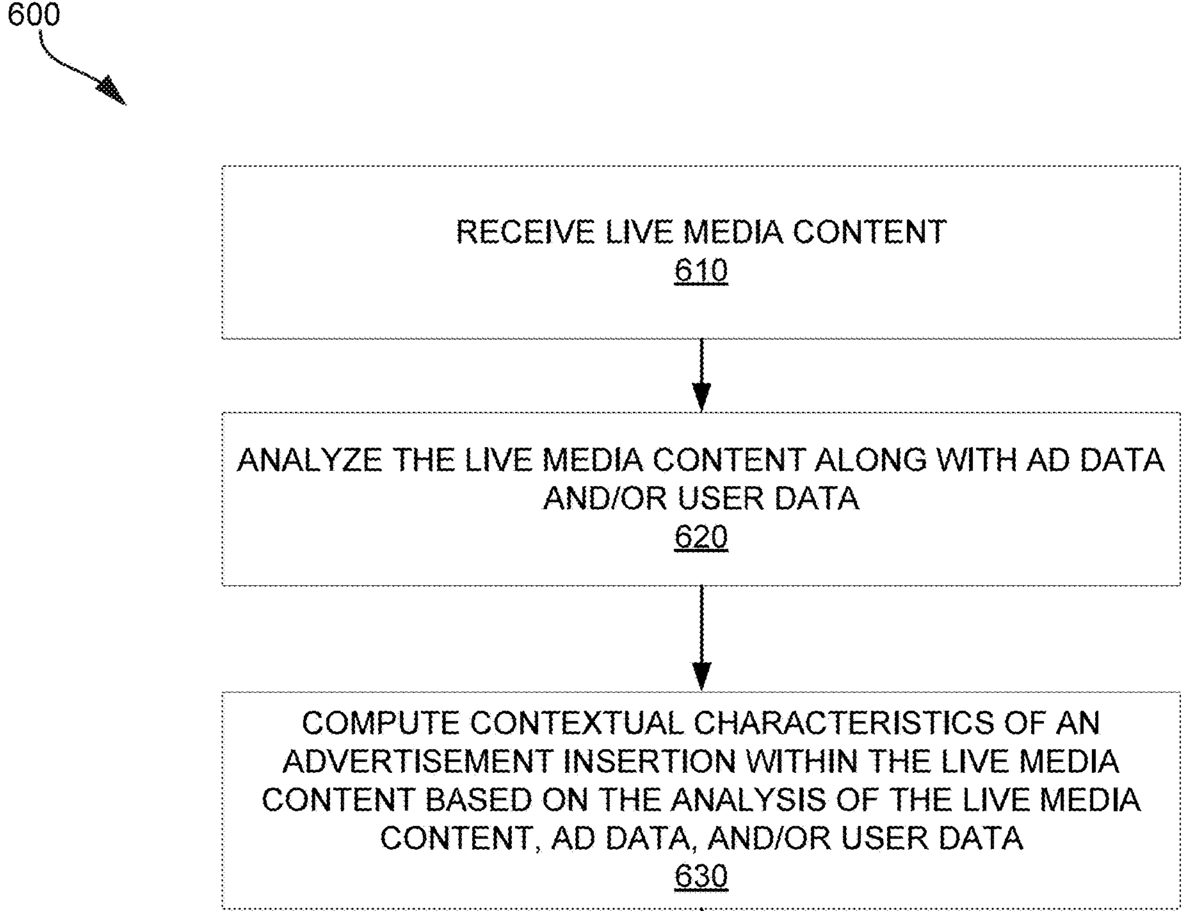
FIG. 6 illustrates a flowchart of an example method for determining a contextual aspect of an advertisement break for dynamic advertisement placement within media content, according to some examples of the present disclosure.

FIG. 6 illustrates a flowchart of an example method for determining a contextual aspect of an advertisement for dynamic advertisement placement within media content, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example.

In step 610, method 600 includes receiving live media content, which captures a live event. For example, AD management system 310 may receive live media content 302 (e.g., live broadcasting or livestreaming). In some aspects, AD management system 310 can receive live media content 302 from a content server (e.g., content server(s) 120 over network 118) or live content sources or platforms.

In step 620, method 600 includes analyzing the live media content along with AD data and/or user data. For example, AD management system 310 may analyze/evaluate live media content 302, AD data 304 and/or user data 306, as described with respect to FIG. 3. In some examples, AD management system 310 can evaluate the relationship between one or more attributes identified in live media content 302, AD data 304 and/or user data 306. For example, AD management system 310 can determine if a user/viewer is a fan of any of the teams or players in a sports game captured in live media content 302 based on the analysis of live media content 302 and user data 306.

In step 630, method 600 includes computing contextual characteristics of an advertisement insertion within the live media content based on the analysis of the live media content, AD data, and/or user data. For example, AD management system 310 can analyze and evaluate various contextual parameters (e.g., a relevance between a live event, a viewer, and an advertisement) that are derived from live media content 302, AD data 304, and/or user data 306 to determine a context associated with an advertisement to be inserted within live media content 302 such as a type or genre of an advertisement, a relevance to a viewer/audience, content alignment, cultural sensitivity, a background or surrounding environment of the advertisement, and so on.

Non-limiting examples of parameters that can be considered may include a type, theme, or genre of a live event, a geographic location or venue of the live event, a format or rules of the live event, participants in the live event and their profiles, a banner, sign, advertising board, or any advertising-related objects displayed in the live event, on-going or real-time progress of the live event, a current mood and/or sentiment, a time and/or date, weather, a sound or dialogue in live media content 302, user demographics, user preferences, a geographic region or location of the viewer or a location for streaming live media content 302, privacy settings, viewing history or viewing patterns, search history, social media data, a relationship between live event and user's preferences, and/or any combination thereof.

By way of example, AD management system 310 can identify brands or products that are depicted in advertising boards in the stadium, sponsor(s) of the live event, sponsor(s) of teams or players of the live event, commercials or advertisements associated with teams or players of the live event, shopping history of a viewer, etc. based on live media content 302, AD data 304, and/or user data 306 to determine contextual characteristics of an advertisement to be inserted within live media content 302. For example, if the live event in live media content 302 involves a football game and a viewer is a football fan, an advertisement for insertion within live media content 302 can be related to sports brands, sports gear, etc.

In step 640, method 600 includes selecting an advertisement to be inserted within the live media content based on the contextual characteristics. For example, AD management system 310 can choose a particular advertisement to be placed within live media content 302 for playback on a user device (e.g., media device 106 or a device associated with user 132 who may be viewing live media content 302) that satisfies the contextual characteristics. As follows, AD management system 310 can determine an advertisement break that is tailored to a particular content or conveys a certain mood or atmosphere to create an engaging user experience for a user/viewer.

Figure 7:
FIG. 7 illustrates a flowchart of an example method for dynamically placing an advertisement within media content based on content understanding and user data, according to some examples of the present disclosure.
Figure 7:
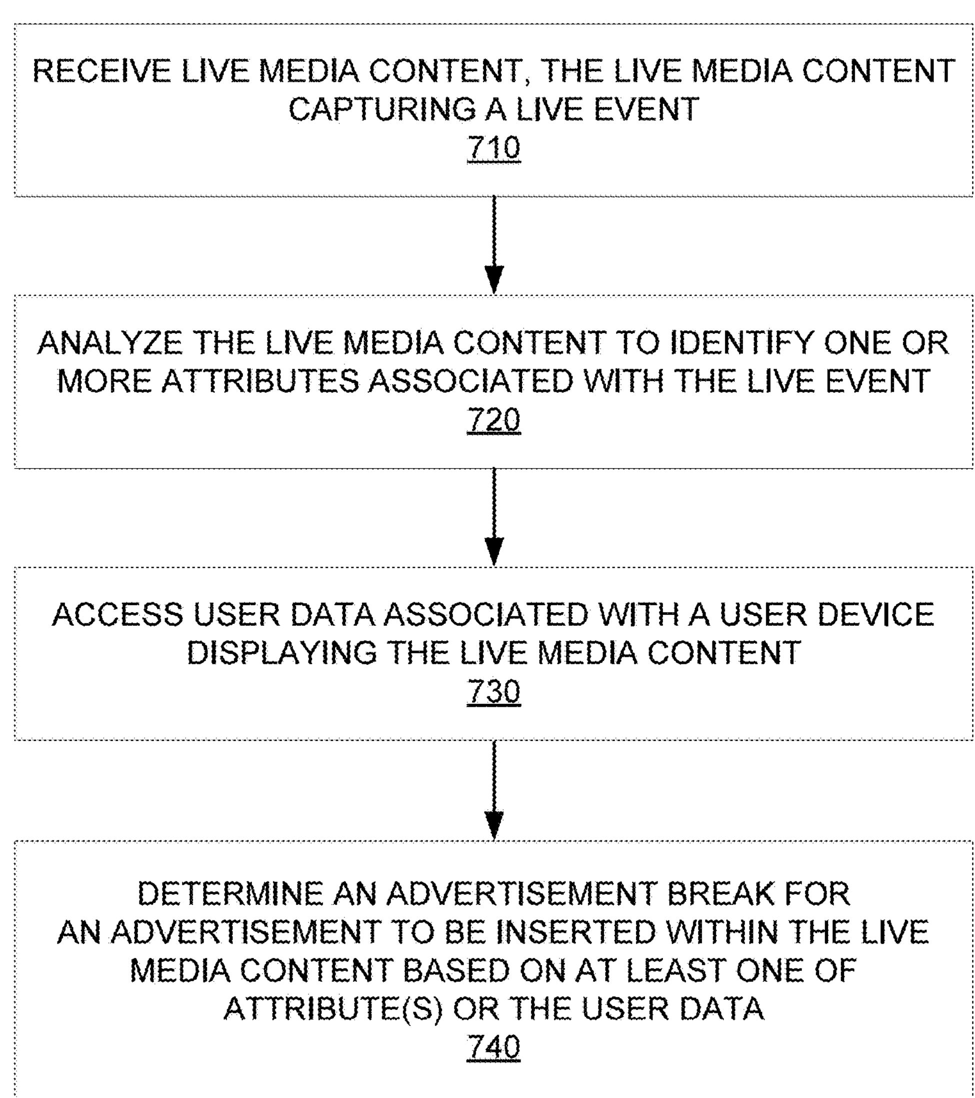

FIG. 7 illustrates a flowchart of an example method 700 for dynamically placing an advertisement within media content based on content understanding and user data, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example.

In step 710, method 700 includes receiving live media content, which captures a live event. For example, AD management system 310 may receive live media content 302 that is streaming or broadcasting a live event in real time. In some aspects, AD management system 310 can receive live media content 302 from a content server (e.g., content server(s) 120 over network 118) or live content sources or platforms.

In step 720, method 700 includes analyzing the live media content to identify one or more attributes associated with the live event. For example, AD management system 310 may analyze live media content 302 to identify attribute(s) associated with the live event. Non-limiting examples of attributes associated with the live event can include a type, theme, or genre of the live event associated with the live media content (e.g., content 122), a geographic location or venue of the live event, a format or rules of the live event, participants in the live event (e.g., hosts, presenters, players, performers, guests, collaborators, etc.) and their profiles (e.g., demographics, statistics, sponsorships, etc.), a banner, sign, advertising board (e.g., perimeter advertising boards), or any advertising-related objects displayed in the live event, on-going or real-time progress of the live event, a current mood and/or sentiment, a time and/or date, weather, and/or any other characteristics associated with the live event captured in content 122.

In step 730, method 700 includes accessing user data (e.g., user profile, user profile information, etc.) associated with a user device displaying the live media content. For example, AD management system 310 may access user data 306 associated with a user device that is playing the live media content. The user data can provide any information associated with user(s) 132 or viewer who may be or is currently viewing live media content 302 such as user demographics (e.g., age, sex, geographic location, income, generation, occupation, etc.), user preferences (e.g., following teams or players, etc.), a geographic region or location of the viewer or a location for streaming live media content 302, privacy settings, viewing history or viewing patterns, search history, social media data representing social media activities, and so on.

Further, method 700 includes accessing advertisement data associated with an advertisement(s) that is to be inserted within the live media content. For example, AD management system 310 may access AD data 304, which can provide information associated with advertisement(s) that are to be inserted within live media content 302, such as a name of the product(s), a brand(s), an event(s), a message(s), an object(s), a service(s), and/or any other item that is depicted in the advertisement(s), advertisement history, marketplaces, target consumers/customers, a sponsoring team, player, or athlete, a brand ambassador or celebrity endorser, and so on. In some illustrations, AD data 304 can further include information associated with a source identifier or advertiser data such as a business name, a brand name, a type of business or industry, a logo, a business location, a style or image that the advertisement is promoting, etc.

In step 740, method 700 includes determining an advertisement break for an advertisement to be inserted within the live media content based on at least one of attribute(s) or the user data. For example, AD management system 310 may determine temporal, spatial, and contextual aspects of an advertisement break for an advertisement to be inserted within live media content 302 based on at least one of attribute(s) or the user data 306.

While determinations of temporal, spatial, and contextual characteristics of an advertisement break are described, respectively, with respect to FIGS. 4, 5, and 6, AD management system 310 may compute various dimensions of an advertisement break (including the temporal, spatial, and contextual aspects) collectively and simultaneously to generate an advertisement insertion within live media content that is content-specific, advertiser-specific, and/or user-specific. For example, live media content would have a different advertisement break/insertion therewithin depending on a location, date, time, or any other condition for streaming the live media content, or for different users.

Figure 8:
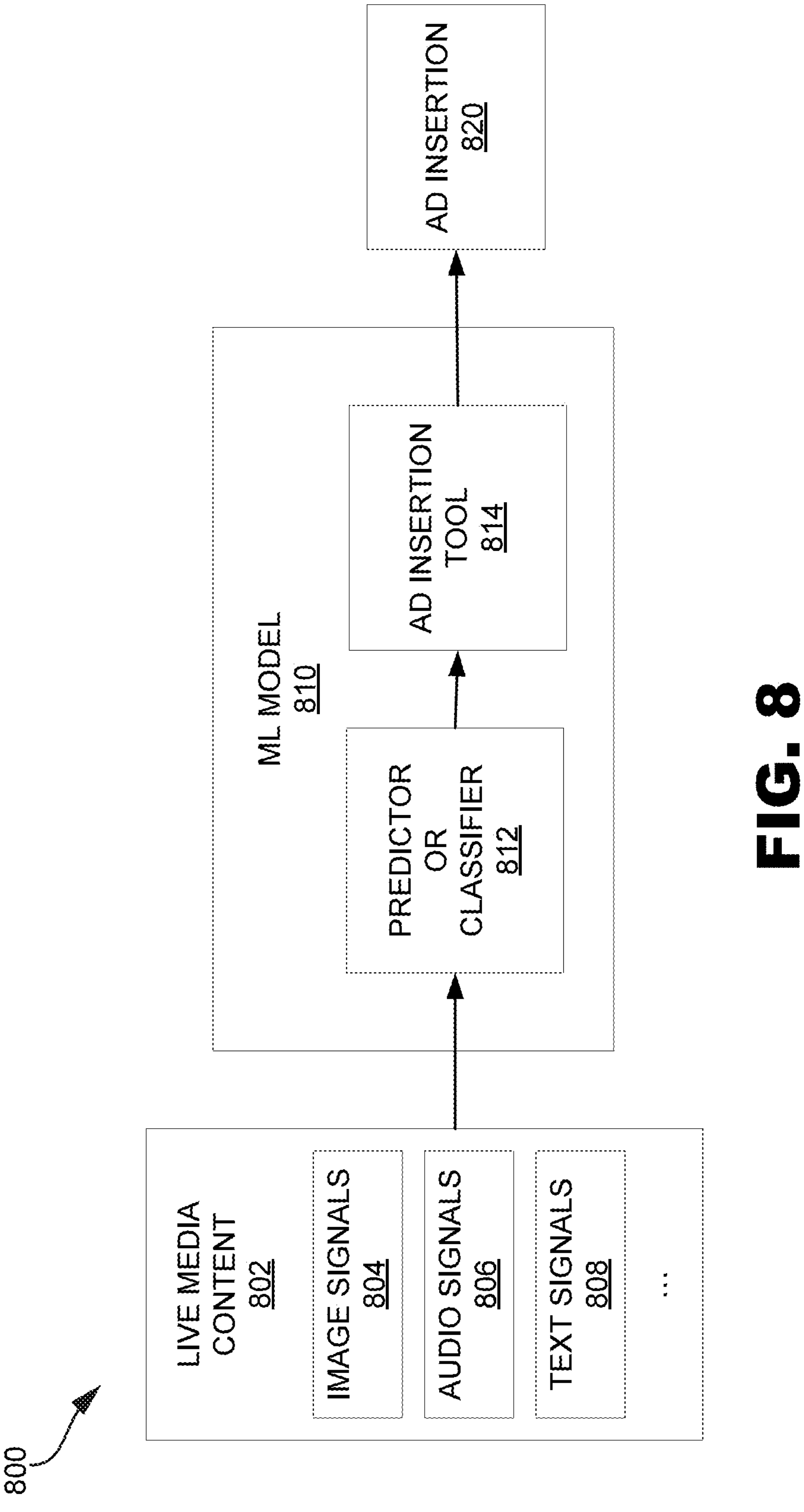
FIG. 8 illustrates an example system flow for dynamic advertisement insertion within media content, according to some examples of the present disclosure.

FIG. 8 illustrates an example system flow 800 for dynamic advertisement insertion within media content using a machine learning model, according to some examples of the present disclosure. The live media content 802 (similar to live media content 302 as illustrated in FIG. 3) can include one or more frames (e.g., video frames) that capture a live event for serving on a user device in real time. In this example, ML model 810 can receive live media content 802 that include image signals 804, audio signals 806, text signals 808, and so on. In some examples, ML model 810 can also receive metadata (not shown) associated with live media content 802.

The ML model 810 can include an artificial neural network configured to process and/or generate event captions from an input (e.g., live media content 802 comprising image signals 804, audio signals 806, and other signals), which represent information about live media content 802. In some examples, ML model 810 (e.g., predictor or classifier 812) can be configured to learn and/or understand context or identify one or more attributes associated with live media content 302. Based on the identified context or attributes of live media content 802, AD insertion tool 814 can determine an advertisement break in various dimensions (e.g., temporal, spatial, and contextual characteristics), which then generate an output, AD insertion 820 that can be placed within live media content 802.

The ML model 810 can be trained with historical footage of live event that does not include an advertisement break. For example, ML model 810 can be trained with live event recordings that include actions or activities that would likely trigger a pause in action or an advertisement break. The training of ML model 810 can allow the ML model 810 (or neural network) to better understand the live media content, relationships and/or patterns in the live media content, and/or other information about the live media content. This in turn can help ML model 810 perform better when predicting various aspects of an advertisement insertion within the live media content (e.g., temporal, spatial, and contextual aspects as illustrated herein).

Figure 9:
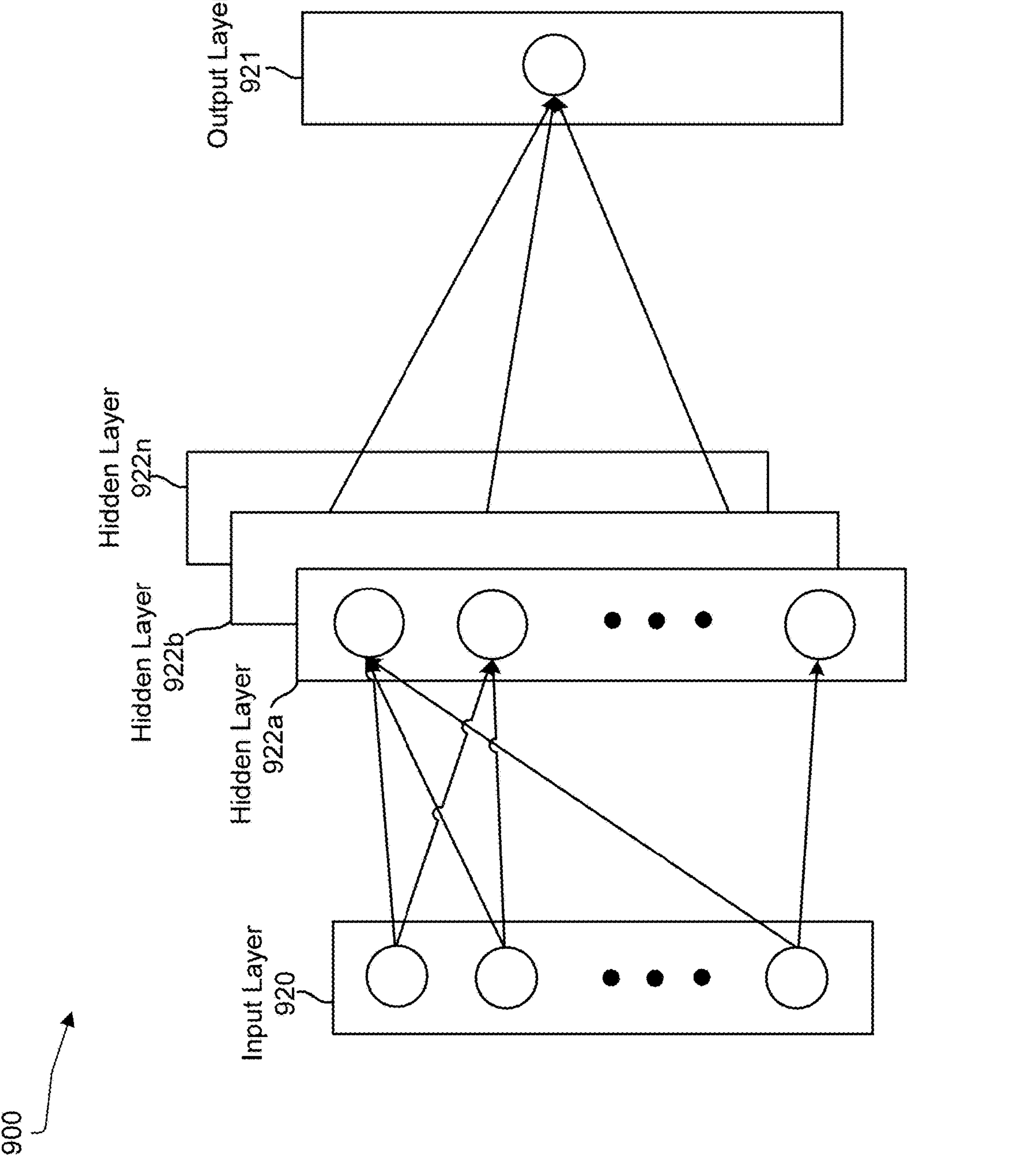
FIG. 9 is a diagram illustrating an example of a neural network architecture, according to some examples of the present disclosure.

FIG. 9 is a diagram illustrating an example of a neural network architecture 900 that can be used to implement some or all of the neural networks described herein (e.g., ML model 810). The neural network architecture 900 can include an input layer 920 can be configured to receive and process data to generate one or more outputs. The neural network architecture 900 also includes hidden layers 922*a*, 922*b*, through 922*n*. The hidden layers 922*a*, 922*b*, through 922*n* include “n” number of hidden layers, where “n” is an integer greater than or equal to one. The number of hidden layers can be made to include as many layers as needed for the given application. The neural network architecture 900 further includes an output layer 921 that provides an output resulting from the processing performed by the hidden layers 922*a*, 922*b*, through 922*n*.

The neural network architecture 900 is a multi-layer neural network of interconnected nodes. Each node can represent a piece of information. Information associated with the nodes is shared among the different layers and each layer retains information as information is processed. In some cases, the neural network architecture 900 can include a feed-forward network, in which case there are no feedback connections where outputs of the network are fed back into itself. In some cases, the neural network architecture 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922*a*. For example, as shown, each of the input nodes of the input layer 920 is connected to each of the nodes of the first hidden layer 922*a*. The nodes of the first hidden layer 922*a* can transform the information of each input node by applying activation functions to the input node information. The information derived from the transformation can then be passed to and can activate the nodes of the next hidden layer 922*b*, which can perform their own designated functions. Example functions include convolutional, up-sampling, data transformation, and/or any other suitable functions. The output of the hidden layer 922*b* can then activate nodes of the next hidden layer, and so on. The output of the last hidden layer 922*n* can activate one or more nodes of the output layer 921, at which an output is provided. In some cases, while nodes in the neural network architecture 900 are shown as having multiple output lines, a node can have a single output and all lines shown as being output from a node represent the same output value.

In some cases, each node or interconnection between nodes can have a weight that is a set of parameters derived from the training of the neural network architecture 900. Once the neural network architecture 900 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 900 to be adaptive to inputs and able to learn as more and more data is processed.

The neural network architecture 900 is pre-trained to process the features from the data in the input layer 920 using the different hidden layers 922*a*, 922*b*, through 922*n* in order to provide the output through the output layer 921.

In some cases, the neural network architecture 900 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 900 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total=\Sigma(\frac{1}{2}\ (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 900 can perform a backward pass by determining which inputs (weights) most contributed to the loss of the network, and can adjust the weights so that the loss decreases and is eventually minimized.

The neural network architecture 900 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 900 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 10:
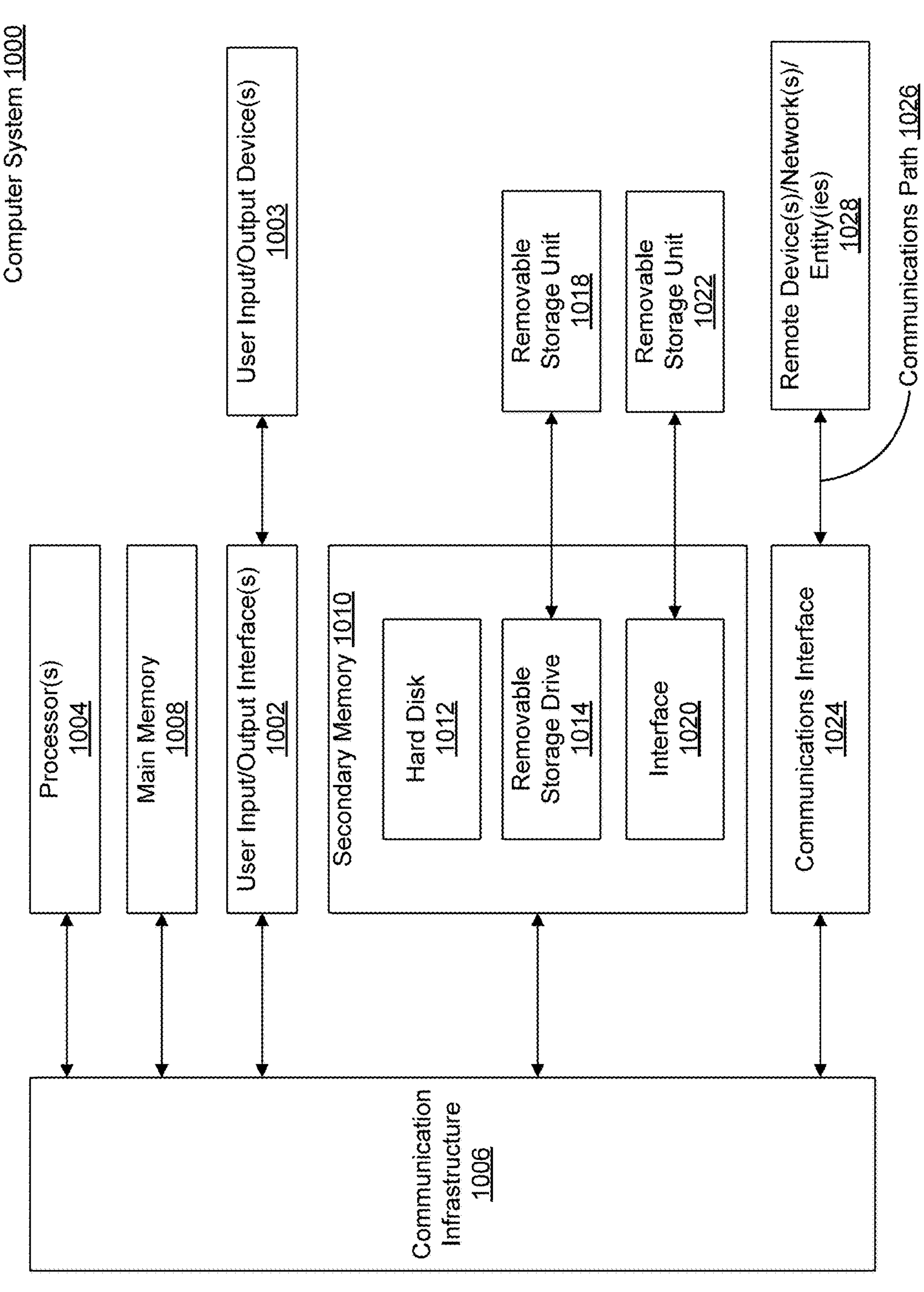
FIG. 10 illustrates an example computer system that can be used for implementing various aspects of the present disclosure.

Various aspects and examples may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the aspects and examples discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system xx00 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communications path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: one or more memories; and at least one processor coupled to the one or more memories and configured to perform operations comprising: receiving live media content, the live media content capturing a live event; analyzing the live media content to identify one or more attributes associated with the live event; accessing user data associated with a user device displaying the live media content; and determining a time at which an advertisement is to be inserted within the live media content based on at least one of the one or more attributes or the user data.

Aspect 2. The system of Aspect 1, wherein the at least one processor is configured to perform operations comprising: determining a display size of the advertisement, for when the advertisement is presented on the user device, based on at least one of the one or more attributes or the user data.

Aspect 3. The system of Aspect 2, wherein the at least one processor is configured to perform operations comprising: adjusting the display size of the advertisement relative to a display size of the live media content, while the advertisement is displayed on the user device, based on an ongoing action of the live event.

Aspect 4. The system of any of Aspects 1 to 3, wherein the at least one processor is configured to perform operations comprising: determining a volume level associated with the advertisement relative to a volume level of the live media content based on at least one of the one or more attributes or the user data.

Aspect 5. The system of any of Aspects 1 to 4, wherein the at least one processor is configured to perform operations comprising: determining a context of the advertisement based on at least one of the one or more attributes associated with the live event or the user data.

Aspect 6. The system of any of Aspects 1 to 5, wherein the at least one processor is configured to perform operations comprising: determining a duration of the advertisement or a number of advertisements to be inserted within the live media content based on at least one of the one or more attributes associated with the live event or the user data.

Aspect 7. The system of any of Aspects 1 to 6, wherein the time in the live media content for the advertisement to be inserted is determined using a machine learning model.

Aspect 8. The system of any of Aspects 1 to 7, wherein analyzing the live media content to identify the one or more attributes associated with the live media content comprises: generating, based on one or more signals in the live media content, one or more event captions representing information about the live media content, wherein the one or more signals comprise a visual signal, an audio signal, or a closed caption signal.

Aspect 9. The system of any of Aspects 1 to 8, wherein the one or more attributes associated with the live event include at least one of a geographic location of the live event, a type or genre of the live event, a venue of the live event, players or participants in the live event, an audience of the live event, sponsors of the live event, statistics relating to the live event, a progress of the live event, or rules of the live event.

Aspect 10. The system of any of Aspects 1 to 9, wherein the user data includes at least one of user preferences, viewing history, demographics, or social media data.

Aspect 11. A method comprising: receiving live media content, the live media content capturing a live event; analyzing the live media content to identify one or more attributes associated with the live event; accessing user data associated with a user device displaying the live media content; and determining a time at which an advertisement is to be inserted within the live media content based on at least one of the one or more attributes or the user data.

Aspect 12. The method of Aspect 11, further comprising: determining a display size of the advertisement, for when the advertisement is presented on the user device, based on at least one of the one or more attributes or the user data.

Aspect 13. The method of Aspect 12, further comprising: adjusting the display size of the advertisement relative to a display size of the live media content, while the advertisement is displayed on the user device, based on an ongoing action of the live event.

Aspect 14. The method of any of Aspects 11 to 13, further comprising: determining a volume level associated with the advertisement relative to a volume level of the live media content based on at least one of the one or more attributes or the user data.

Aspect 15. The method of any of Aspects 11 to 14, further comprising: determining a context of the advertisement based on at least one of the one or more attributes associated with the live event or the user data.

Aspect 16. The method of any of Aspects 11 to 15, further comprising: determining a duration of the advertisement or a number of advertisements to be inserted within the live media content based on at least one of the one or more attributes associated with the live event or the user data.

Aspect 17. The method of any of Aspects 11 to 16, wherein the time in the live media content for the advertisement to be inserted is determined using a machine learning model.

Aspect 18. The method of any of Aspects 11 to 17, wherein analyzing the live media content to identify the one or more attributes associated with the live media content comprises: generating, based on one or more signals in the live media content, one or more event captions representing information about the live media content, wherein the one or more signals comprise a visual signal, an audio signal, or a closed caption signal.

Aspect 19. The method of any of Aspects 11 to 18, wherein the one or more attributes associated with the live event include at least one of a geographic location of the live event, a type or genre of the live event, a venue of the live event, players or participants in the live event, an audience of the live event, sponsors of the live event, statistics relating to the live event, a progress of the live event, or rules of the live event.

Aspect 20. A non-transitory computer-readable medium having instructions stored thereon that, when executed by at least one computing device, cause the at least one computing device to perform a method according to any of Aspects 11 to 19.

Aspect 21. A system comprising means for performing a method according to any of Aspects 11 to 19.

Aspect 22. A computer program product having stored thereon instructions which, when executed by one or more processors, cause the one or more processors to perform a method according to any of Aspects 11 to 19.

What is claimed is:

1. A system comprising:

one or more memories; and at least one processor coupled to the one or more memories and configured to perform operations comprising:

receiving live media content, the live media content capturing a live event;

identifying one or more attributes associated with the live event based on the live media content;

accessing user data associated with a user device displaying the live media content;

determining, for one or more time intervals of the live event, a corresponding predicted activity level, based on the one or more attributes and the user data; and determining a time interval of the one or more time intervals at which an advertisement is to be inserted within the live media content based on the predicted activity level of each of the one or more time intervals.

2. The system of claim 1, wherein the at least one processor is configured to perform operations comprising:

determining a display size of the advertisement, for when the advertisement is presented on the user device, based on at least one of the one or more attributes or the user data.

3. The system of claim 2, wherein the at least one processor is configured to perform operations comprising:

adjusting the display size of the advertisement relative to a display size of the live media content, while the advertisement is displayed on the user device, based on a confidence level of the predicted activity level of the time interval.

4. The system of claim 1, wherein the at least one processor is configured to perform operations comprising:

determining a volume level associated with the advertisement relative to a volume level of the live media content based on at least one of the one or more attributes or the user data.

5. The system of claim 1, wherein the at least one processor is configured to perform operations comprising:

determining a context of the advertisement based on at least one of the one or more attributes associated with the live event or the user data.

6. The system of claim 1, wherein the at least one processor is configured to perform operations comprising:

determining a duration of the advertisement or a number of advertisements to be inserted within the live media content based on at least one of the one or more attributes associated with the live event or the user data.

7. The system of claim 1, wherein the time in the live media content for the advertisement to be inserted is determined using a machine learning model.

8. The system of claim 1, wherein analyzing the live media content to identify the one or more attributes associated with the live media content comprises:

generating, based on one or more signals in the live media content, one or more event captions representing information about the live media content, wherein the one or more signals comprise a visual signal, an audio signal, or a closed caption signal.

9. The system of claim 1, wherein the one or more attributes associated with the live event include at least one of a geographic location of the live event, a type or genre of the live event, a venue of the live event, players or participants in the live event, an audience of the live event, sponsors of the live event, statistics relating to the live event, a progress of the live event, or rules of the live event.

10. The system of claim 1, wherein the user data includes at least one of user preferences, viewing history, demographics, or social media data.

11. A method comprising:

receiving live media content, the live media content capturing a live event;

identifying one or more attributes associated with the live event based on the live media content;

accessing user data associated with a user device displaying the live media content;

determining, for one or more time intervals of the live event, a corresponding predicted activity level, based on the one or more attributes and the user data; and determining a time interval of the one or more time intervals at which an advertisement is to be inserted within the live media content based on the predicted activity level of each of the one or more time intervals.

12. The method of claim 11, further comprising:

determining a display size of the advertisement, for when the advertisement is presented on the user device, based on at least one of the one or more attributes or the user data.

13. The method of claim 12, further comprising:

adjusting the display size of the advertisement relative to a display size of the live media content, while the advertisement is displayed on the user device, based on a confidence level of the predicted activity level of the time interval.

14. The method of claim 11, further comprising:

determining a volume level associated with the advertisement relative to a volume level of the live media content based on at least one of the one or more attributes or the user data.

15. The method of claim 11, further comprising:

determining a context of the advertisement based on at least one of the one or more attributes associated with the live event or the user data.

16. The method of claim 11, further comprising:

determining a duration of the advertisement or a number of advertisements to be inserted within the live media content based on at least one of the one or more attributes associated with the live event or the user data.

17. The method of claim 11, wherein the time in the live media content for the advertisement to be inserted is determined using a machine learning model.

18. The method of claim 11, wherein analyzing the live media content to identify the one or more attributes associated with the live media content comprises:

generating, based on one or more signals in the live media content, one or more event captions representing information about the live media content, wherein the one or more signals comprise a visual signal, an audio signal, or a closed caption signal.

19. The method of claim 11, wherein the one or more attributes associated with the live event include at least one of a geographic location of the live event, a type or genre of the live event, a venue of the live event, players or participants in the live event, an audience of the live event, sponsors of the live event, statistics relating to the live event, a progress of the live event, or rules of the live event.

20. A non-transitory computer-readable medium having instructions stored thereon that, when executed by at least one computing device, cause the at least one computing device to perform operations comprising:

receiving live media content, the live media content capturing a live event;

identifying one or more attributes associated with the live event based on the live media content;

accessing user data associated with a user device displaying the live media content;

determining, for one or more time intervals of the live event, a corresponding predicted activity level, based on the one or more attributes and the user data; and determining a time interval of the one or more time intervals at which an advertisement is to be inserted within the live media content based on the predicted activity level of each of the one or more time interval.

* * * * *